(12) United States Patent
Huggett

(10) Patent No.: US 6,633,251 B1
(45) Date of Patent: Oct. 14, 2003

(54) ELECTRIC SIGNALLING SYSTEM

(75) Inventor: William K. Huggett, North Caldwell, NJ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 05/673,296

(22) Filed: Mar. 31, 1976

(51) Int. Cl.⁷ .............................. G01S 7/36; G01S 7/42; H04K 3/00
(52) U.S. Cl. ........................................................ 342/14
(58) Field of Search .................. 343/18 E, 120; 330/9; 342/14, 13; 455/1

Primary Examiner—Thomas H. Tarcza
Assistant Examiner—Brian Andrea
(74) Attorney, Agent, or Firm—Daly, Crowley & Mofford, LLP

(57) ABSTRACT

A system is provided, for use in "cross-eye" ECM systems, and in other application, by means of which two radio-frequency signals having a specific temporal relationship can be amplified in the same amplifier, and without significantly affecting their temporal relationship. One signal is stored in a first delay line and the second is stored in a second delay line of larger capacity. The first signal upon emerging from the first delay line is sent to the second delay line behind the second signal. Upon emerging from the second delay line, after the first signal has completely entered the second delay line, the second signal is amplified in an amplification device and sent to the first delay line. It thus emerges from the first delay line at the same time as the first signal emerges from the amplifier, or the two emerge from the first delay line and the amplifier, in their original temporal relationship.

11 Claims, 4 Drawing Sheets

ELECTRIC SIGNALLING SYSTEM

BACKGROUND AND SUMMARY OF THE INVENTION

This invention relates to a method and system for amplifying two or more radio frequency signals having a specific temporal relationship in such a way that said relationship is not significantly affected. Although it is of more general applicability, a principal use is in a modification of the electronic counter measures (ECM)system known as "cross-eye", and its application to such systems will be specifically described.

In the "cross-eye" system, radar signals are received by two antennas located some distance apart on the target. One of the received signals is shifted 180° in phase, the two signals are amplified, and re-transmitted. Because the two transmitted signals are 180° out of phase, when they are received by the hostile radar receiver they cancel each other out at the focal point, leaving a "hole" where the point of maximum strength would ordinarily be perceived. In addition, the relative amplitude of the two re-transmitted signals may be varied for further deception.

To make "cross-eye" an effective technique, it is important, among other things, that the relationship in time between the signals received at the two target antennae be preserved precisely. If two amplifier systems are used, this is not possible, as a practical matter, because of inherent differences between two amplifier systems no matter how carefully they are constructed. An attempt has been made to circumvent this difference by time sharing the same amplifier. Two such systems are described in my copending application Ser. No. 05/024,933, filed Apr. 1, 1970. However, one of the systems there described is subject to isolation problems caused by reflections in the delay line. The other introduces a small time difference in the transmission of the two signals. While this is acceptable if one is dealing with radars having narrow processing bands its applicability is limited to such narrow band systems and it is ineffective with other systems.

According to the present invention, the limitations inherent in the previous time sharing systems referred to are overcome and the received signals may be amplified with adequate isolation and retransmitted (with a phase change for one signal, as desired) without significantly changing the temporal relationship between them. To accomplish these ends, the invention in its broadest aspect provides a system comprising a first delay means, means for delivering a first signal to said first delay means, a second delay means, means for delivering a second signal to said second delay means, means for delivering said first signal from said first delay means to said second delay means after said second signal has entered said second delay means, signal amplification means connected to said second delay means and switching means for alternately maintaining the output from said amplification means connected to said first delay means while said second signal is emerging from said amplification means, and for maintaining the output from said amplification means disconnected from said first delay means while said first signal is emerging from said amplification means, whereby the amplified second signal may be recovered from said first delay means and the amplified first signal may be recovered from said amplification means without affecting significantly their temporal relationship. In an-ECM system said signals may be taken from antenna means, and retransmitted through the antenna means, the first signal being transmitted through the antenna used to receive the second signal and vice versa. Phase reversal means for one signal may be provided.

BRIEF DESCRIPTION OF THE DRAWINGS

The invention will be described more fully with reference to the accompanying drawings in which.

DETAILED DESCRIPTION OF THE DRAWINGS

Figure 1:
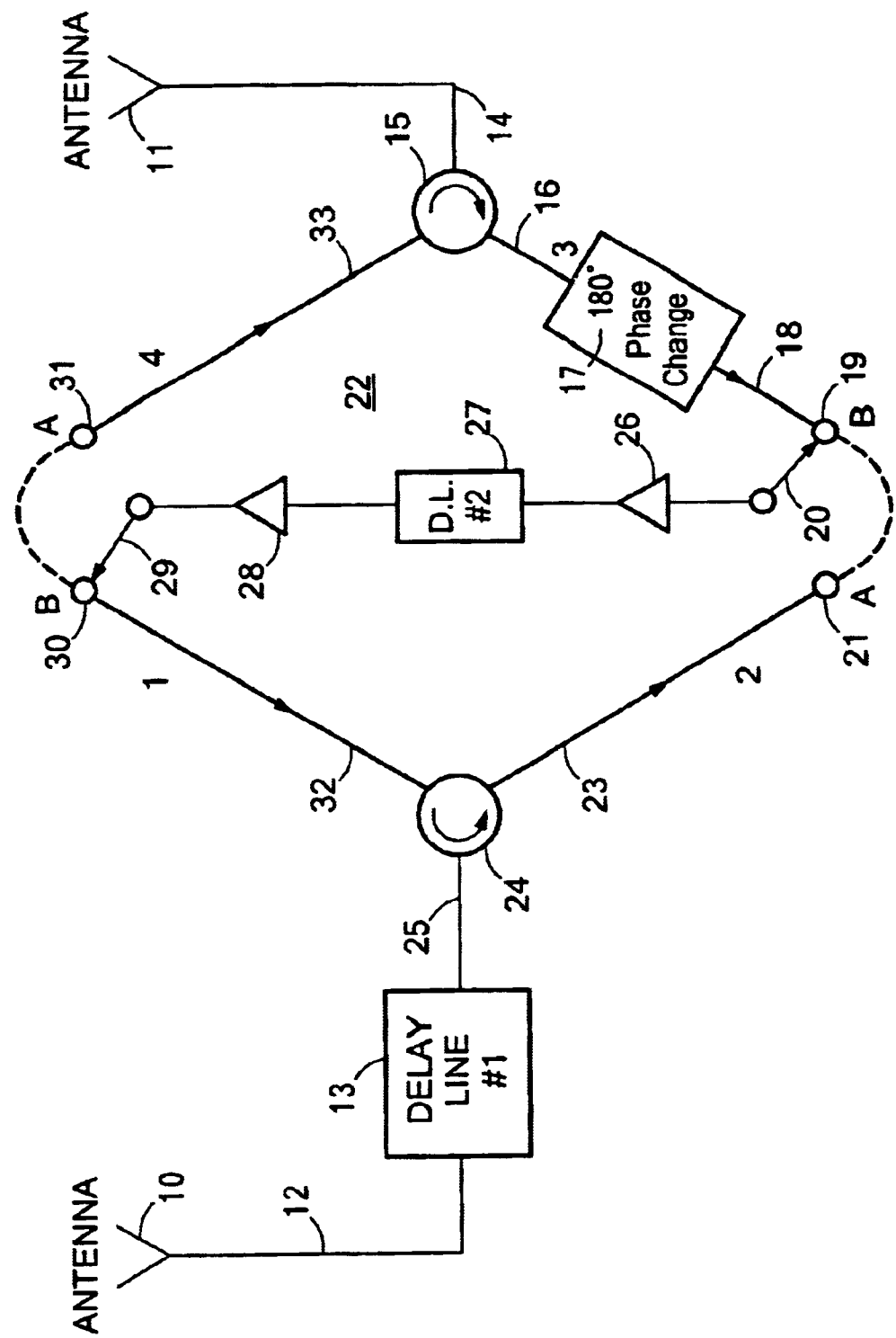
FIG. 1 is a simplified schematic diagram of a "cross-eye" ECM system according to the invention.

Referring first to FIG. 1, a "cross-eye" ECM system according to the invention comprises two antennae 10, 11. A lead 12, normally a waveguide (as are the other leads and connecting elements disclosed herein) connects antenna 10 to a first delay line 13.

Antenna 11 is connected by a lead 14 to a circulator 15 which in turn is connected via a line 16 to a phase reversal device 17 capable of reversing the phase of the signal received in antenna 11 by 180°. The device 17 is connected via a line 18 to a switching point 19.

A switch 20 is provided for alternately connecting the switch point 19 and a switch point 21 to an amplification assembly indicated generally as 22. Switch point 21 is connected via line 23 to circulator 24 and line 25 to the first delay line 13.

Amplification assembly 22 comprises a, pre-amplification chain 26, a second delay line 27 and a power amplification chain 28. The output from the amplification chain 28 is connected to a switch 29 which alternately connects to switching points 30 and 31. Switch point 30 is connected via a line 32 to the circulator 24. Switch point 31 is connected via a line 33 to the circulator 15.

The operation of the system is as follows:

Signals are received simultaneously, or at some fixed interval in the antennae 10 and 11. For ease of description, the signal received in antenna 10 is referred to as signal L and that received in antenna 11 as signal R.

Signal L enters the first delay line 13 and remains there for a predetermined time. Signal R passes through circulator 15, line 16, and is reversed in phase (180° phase change) in device 17. Switch 20 is connected to point 19, so that signal R can be delivered to the amplification assembly 22. The signal passes through pre-amplification chain 26 and enters second delay line 27, which has a time delay greater than that of delay line 13. When signal R has completely entered delay line 27, switch 20 is shifted to close switch point 21. At this point, signal L has passed through delay line 13, and it is delivered through circulator 24, line 23 and switch 20 to the amplification assembly 22. It passes through pre-amplification chain 26 and enters second delay line 27 behind signal R. When signal L has completely entered delay line 27, signal R passes from-delay line 27, is amplified in amplification 5 chain 28 and delivered via switch 29, line 32, circulator 24 and line 25 to delay line 13. When signal R has completely left delay line 27, switch 29 is closed on point 31. Signal L after completing its passage through delay line 27, is amplified and delivered via switch 29, line 33, circulator 15 and line 14 to antenna 11 where it is transmitted. Simultaneously, or at whatever time interval existed between the two signals as received, signal R emerges from delay line 13, is conveyed to antenna 10 and transmitted.

It will be seen that since signals L and R move through precisely similar paths (save for the phase inverter) including the same amplification and delay circuits, they will be retransmitted at precisely the same time; or if received at a fixed time interval, will be retransmitted at the same interval. Thus the difficulties associated with previous "cross-eye" ECM systems including my prior time sharing systems are overcome.

It will be further noted that both signals L and R are entirely received and stored in the second delay before either is transmitted. Thus transmission and reception are time isolated. This isolation in time circumvents the isolation problems of other "cross-eye" designs.

Figure 2:
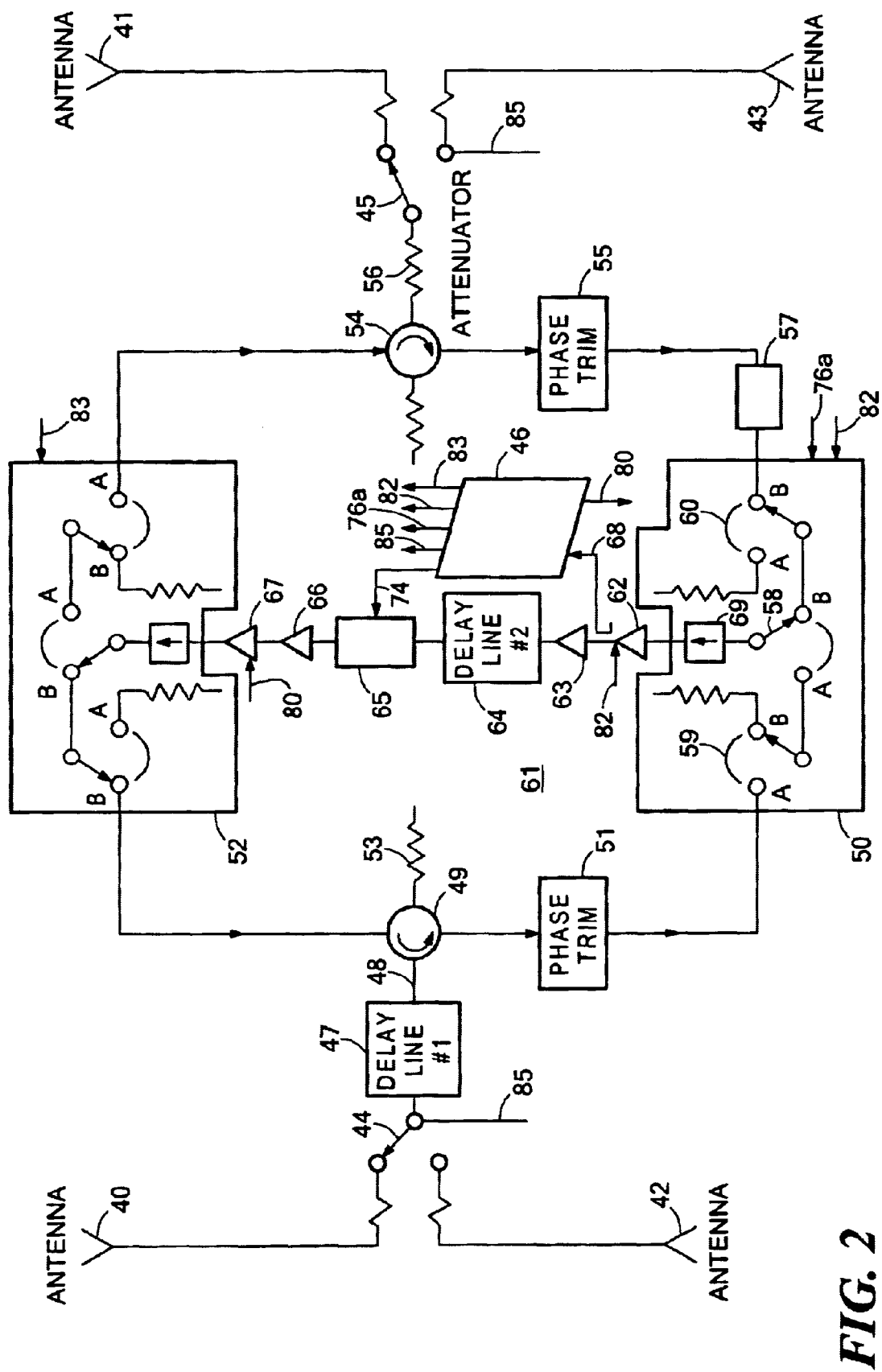
FIG. 2 is a schematic representation showing in more detail a preferred embodiment of the system shown more generally in FIG. 1.

Referring now to FIG. 2, the system of FIG. 1 will be explained in somewhat more detail.

As shown in FIG. 2, a preferred embodiment of the invention may have two sets of antennas indicated as 40, 41, 42, and 43. These may be of any conventional design such as American Electronics Labs (Lansdale, Pa.) Model H-5302R. They may be employed in pairs, 40 and 41, or 42 and 43, being operated at the same time. The selection of which pair is to be used is made via electromechanical switches 44, 45. Switches 44, 45 may be again any conventional type, such as those sold by Waveline Inc. (West Caldwell, N.J.), Model 677-H. They may be activated by a signal transmitted through line 85, responsive to the direction of the received signal, and generated by conventional means not a part of the invention and not shown herein.

Switch 44 connects to a first delay line 47 which in turn is connected via line 48 to a four-port circulator 49. The first delay line 47 may be a circular waveguide such as that manufactured by the Airtron Division of Litton Industries (Morris Plains, N.J.). The circulator may be Model 8H62-1 or 8H62-2 (depending on the hand) manufactured by Microwave Associates of Burlington, Mass.

Circulator 49 is connected to an input switch assembly 50 through a phase trimmer 51, on one side and to an output switch assembly 52 on the other. The fourth port of the circulator may be connected to a dummy load 53. The phase trimmer is inserted simply to correct small phase errors which may exist in the other components. It may be Model W-141-X, manufactured by RGA Research and Development of Syracuse, N.Y.

Inspection of FIG. 2 will show that the right-hand side of the system mimics the left-hand side just described with a circulator 54 and a phase trimmer 55. An attenuator 56 is inserted between the antennas 41, 43 and circulator 54 to compensate for the attenuating effect of delay line 47, which, of course, is omitted on the right-hand side. A phase inverter 57, for example, two waveguide twists such as Waveline Inc. Model 690-2, are inserted between phase trimmer 55 and input switch assembly 50.

The input switch assembly 50 comprises a main switch 58, two auxiliary switches 59, 60 and an isolator 69. The input switch assembly 50 is connected to an amplifier assembly indicated generally as 61, comprising in sequence a pre-amplifier 62, an amplifier-limiter 63, a second delay line 64, a PIN modulator 65, a driver amplifier 66 and a power amplifier 67. All of these elements are of conventional design and by way of example may be the following particular models:

| | |
|---|---|
| Pre-amplifier (62) and amplifier-limiter (63) | International Microwave Corp., Cos Cob, Connecticut Model LACP-9400-55 |
| Second Delay Line (64) | Teledyne MEC, Palo Alto, California Model 7941 |
| PIN Modulator (65) | Hewlett Packard Corp. Palo Alto, California Model 8734 |
| Driver Amplifier (66) | Litton Industries, San Carlos, California Model L-2795-Z |
| Power Amplifier (67) | Varian Associates, Palo Alto, California Model VZX-6983C1 |

The side of the amplification assembly 61 remote from input switch assembly 50 is connected to the output switch assembly 52, which is similar to the input switch assembly 50, except that signal flow direction is reversed.

The pre-amplifier 62 is connected via a line 68 to the system control 46, enabling the control to use the received pulses in amplifier 62 (or the leading and trailing edges thereof) to generate signals for opening and closing the input and output switches, and activating various other elements such as the power amplifier 67 and PIN modulator 65.

A more detailed description of the system control 46 will be presented below in connection with the operation of the system, and with reference to FIGS. 3 and 4.

Figure 3:
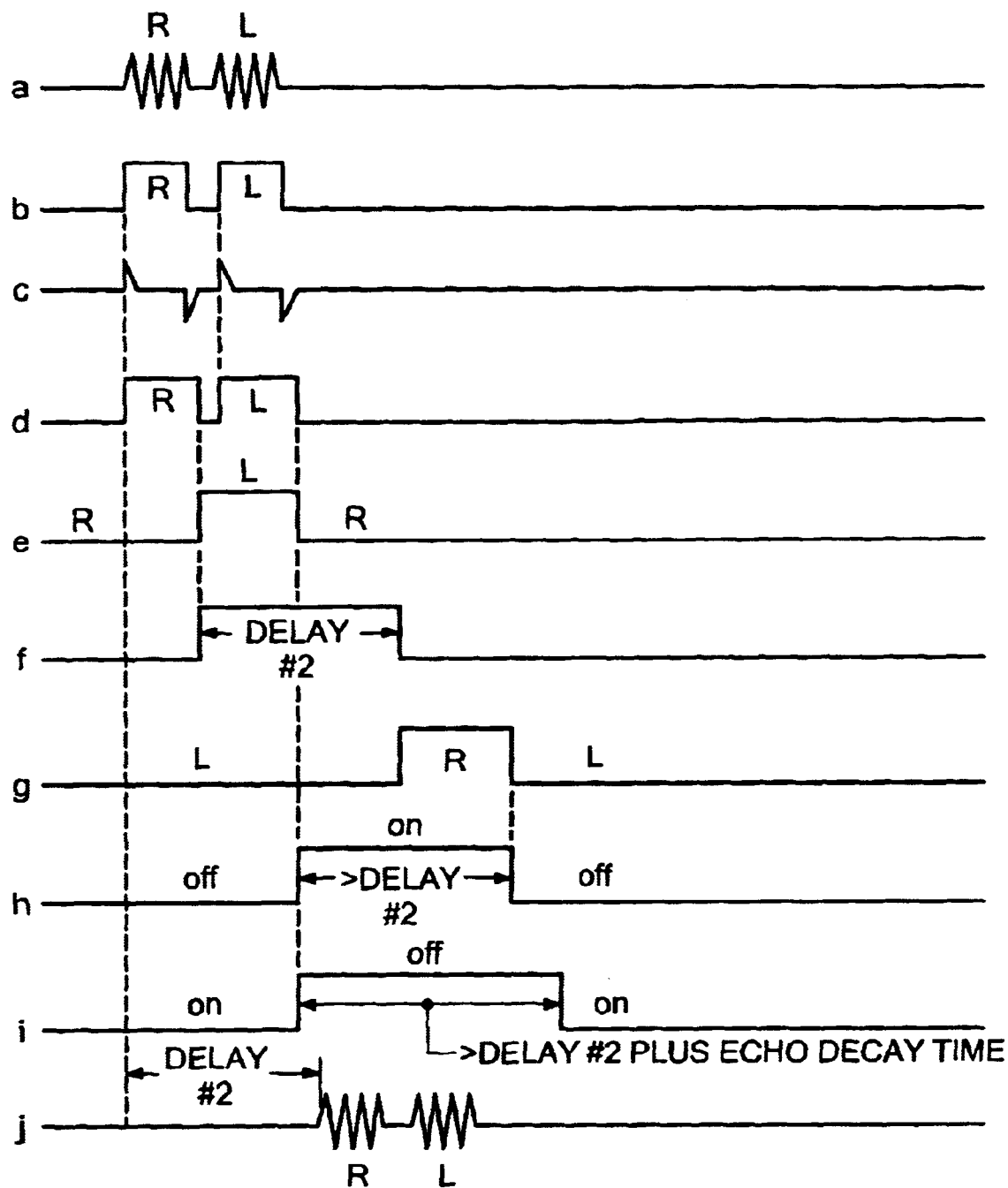
FIGS. 3(a)–(j) are schematic representation of the major control signals developed in the system control element of FIG. 2.
Figure 4:
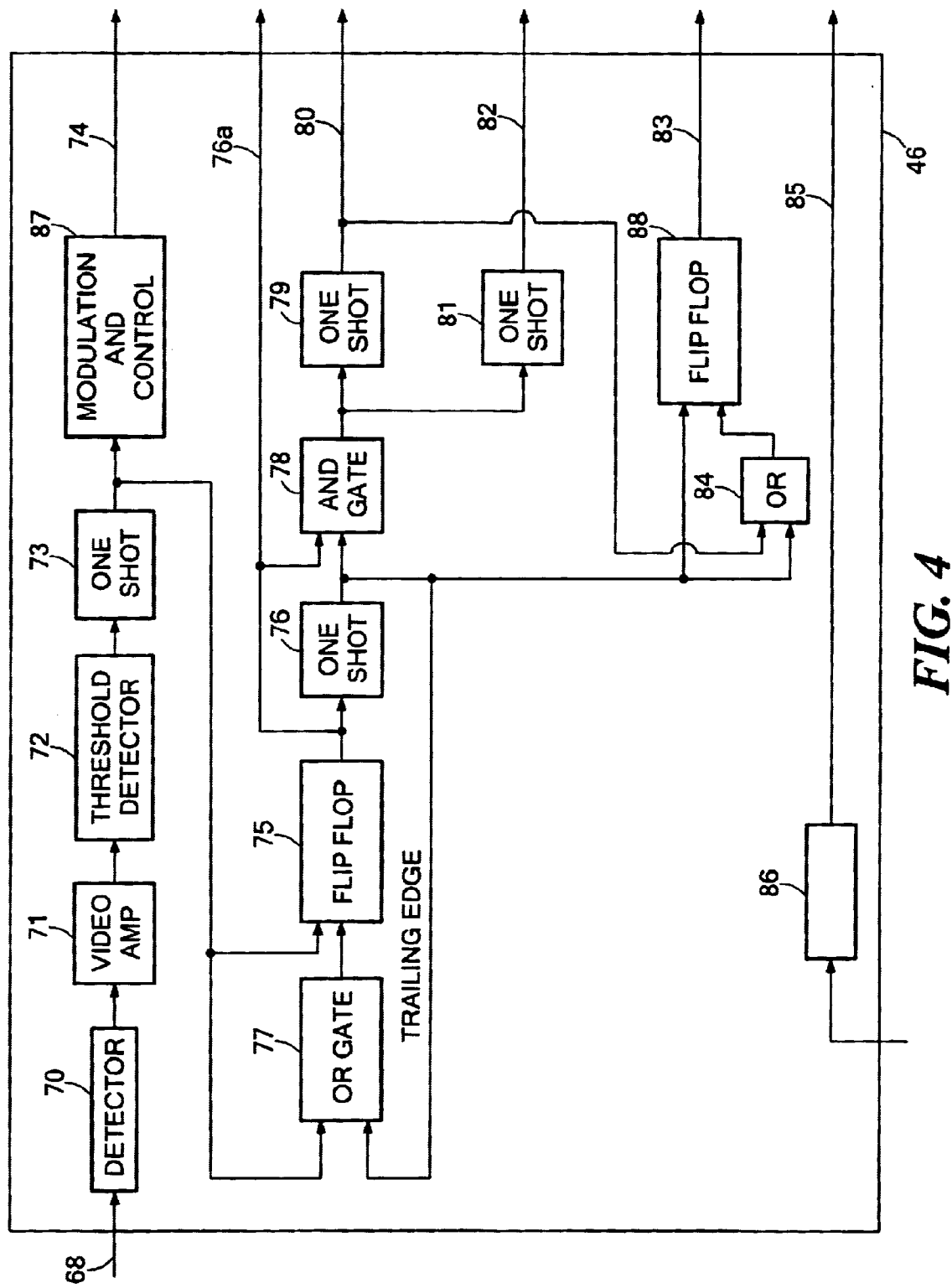
FIG. 4 is a schematic representation of details of the system control of FIG. 2.

To explain operation of the system shown in FIGS. 2–4 assume signals L and R are received simultaneously in antennas 40 and 41. It will be understood that antennas 42 and 43 (or some other pair, not shown) might be employed in place of 40 and 41. Which pair is used is determined by a conventional device not shown, which senses the direction of the hostile signal. This device furnishes a signal to switch driver 86 (FIG. 4) which in turn operates switches 44 and 45 through line 85. Signal L passes through switch 44 and into first delay line 47. This line has a time delay in excess of the time duration of the signal (or a sample thereof), plus any delay the signal may undergo in reaching the right antenna relative to the left, plus the effective transit time of the slower of the input and output switches, if such difference exists. The total delay will be about 500 nanoseconds, for example.

While signal L is traversing delay line 47, signal R from antenna 41 passes through attenuator 56, circulator 54, phase trimmer 55, phase inverter 57 and arrives at input switch assembly 50. At the start of a cycle, input switch assembly is as shown with the main switch 58 and auxiliary switches 59 and 60 at the "B" contacts (FIG. 2). The "R" signal then passes through switch 60, switch 58, and isolator 69 to pre-amplifier 62. The signal is also sent to the system control 46 through line 68.

As shown in FIGS. 3 and 4, in system control 46, the signal in the amplifier assembly is detected in detector 70 and amplified in a video amplifier 71 to give signals bR and bL of line b (FIG. 3). In FIG. 3, it will be appreciated, time runs from the left, i.e., later time is to the right, and signal bR is earlier than signal bL due to the passage of the L signal through delay line 47. The leading edge of signal R is detected in threshold detector 72 and the resulting signal, indicated as "c" in. FIG. 3 operates a one-shot 73 which generates a signal, shown as "d" in FIG. 3. Signal "d" may be sent to a modulation and control circuit device 87; the output of said circuit device feeds via line 74 to PIN modulator 65 (FIG. 2) to activate that device. The circuitry of the modulation and control device 87 may be of conventional design and is not a part of this invention. It controls the PIN modulator as an on/off switch to cut off all or a portion of either the R or L pulse, or both, as they pass through the PIN modulator. Signal "d" together with the known length of the second delay line 64 provides the timing reference necessary to time the switch properly. The trailing edge of signal. "d" R which has a duration of say 200 nanoseconds, is used to set a flip-flop 75 which in turn generates a signal "e" (FIG. 3). This signal "e", in turn generates, via a one-shot 76, a signal "f" shown in FIG. 3. Signal "f" has a duration equal to the second delay line 64 (FIG. 2) which may, for example, be about 800 nanoseconds. Signal "e" is also sent via a line 76a to input switch assembly 50 where it shifts the assembly to the "A" contacts, thus to receive signal L from delay-line 47. Signal L is detected, amplified and used to generate a signal of the type shown in line "d" L of FIG. 3. The trailing edge of the signal "d" L resets flip-flop 75, thus preparing it for a new sequence. It will be observed that if there is no second signal (L), the trailing edge of signal "f" (FIG. 3) is used, through an "or" gate 77, to reset the flip-flop 75.

The signal "f" generated in one-shot 76 is sent to an "and" gate 78 which is rendered operable by the trailing edge of signal "e" generated in flip-flop 75. The trailing edge of signal "e" from "and" gate 78 operates a "one-shot" 79 to produce a signal "h" (FIG. 3) having a duration of say 900 nanoseconds. As shown in FIG. 3, this signal "h" has a duration greater than that of second delay line 64. Signal "h" is conveyed to power amplifier 67 (FIG. 2) via line 80 and when "high" maintains that device in the "on" condition. Just prior to this point, when signal "h" goes "high", both signals R and L are stored in second delay line 64.

Signal "e" from "and" gate 78 is also used to start a one-shot 81 which produces a signal "i" of duration greater than the second delay line 64, plus echo decay time, as indicated in FIG. 3, and which may be on the order of say 3,000 nanoseconds. Signal "i" is sent via line 82 to input switch assembly 50 and amplifier 62 where, when "high", it switches them to an "off" condition. Switch assembly 50 is off when switch 59 is connected to terminal B and switch 60 is at terminal A.

As signal R emerges from second delay line 64, it passes through PIN modulator. 65, driver amplifier 66, power amplifier 67, output switch assembly 52, and circulator 49 to the delay line 47.

The trailing edge of signal "f" produced in one-shot 76 is used to set a flip-flop 88, which generates a signal "g" (FIG. 3). This signal is transmitted to the output switch assembly 52, via a line 83 causing that assembly to shift to the "A" position. At this point, signal L begins to emerge from delay line 64, is amplified and sent via circulator 54, attenuator 56, and switch 45 to antenna 41. At the same time (or with whatever time relation existed between the received R and L signals) signal R emerges from delay line 47 and is conveyed to antenna 40. Both signals are thus transmitted in the same temporal relationship in which they were received.

Line "j" (FIG. 3) shows the R and L signals as they emerged from amplifier 67. R is still ahead of L. However, R has not yet passed through delay line 47. Upon signal R emerging from that delay line the signals are restored to their simultaneous relationship, if that was their received relationship.

The system is restored to its initial conditions by the trailing edge of signal "h" (FIG. 3) which turns the power amplifier 67 back off and bypassing through "or" gate 84, resets flip-flop 88, thus restoring the output switch assembly to its "B" position. Upon expiration of signal "i" generated in one-shot 81, the pre-amplifier 62 is rendered "on" and the input switch assembly 50 is rendered "on" with each switch returned to the "B" position. Thus the system is prepared to receive a second set of signals.

Although the invention has been described in connection with a "cross-eye" ECM system, it will be obvious that it is capable of wider application and can be employed wherever it is desired to amplify two signals or samples of such signals without altering the temporal relationship between them.

What is claimed is:

1. A system for amplifying two radio frequency signals having a specific temporal relationship without significantly altering said relationship, which comprises a first delay means, means for delivering said first signal to said first delay means, a second delay means having a delay capacity greater than said first delay means, means for delivering said second signal to said second delay means, means for delivering said first signal from said first delay means to said second delay means, after said second signal has completely entered said second delay means, signal amplification means connected to the output from said second delay means, and switching means for connecting the output from said amplification a means to said first delay means, while said second signal is emerging from said amplification means, and for disconnecting the output from said amplification means from said first delay means before said first signal emerges from said amplification means, whereby said amplified second signal may be recovered from said first delay means and said amplified first signal may be recovered from said amplification means in the same temporal relationship in which they were received.

2. The system claimed in claim 1 and comprising a first signal receiving means, means connecting said first signal receiving means to one side of said first delay means, second signal receiving means and means for connecting said second signal receiving means to said second delay means.

3. The system claimed in claim 2 wherein said first and second signal receiving means comprise antenna means, said system further comprising input switch means for alternately connecting said second delay means to the other side of said first delay means and to said second signal receiving means.

4. The system claimed in claim 3 and comprising output switch means for alternately connecting the output of the signal amplification means to the other side of said first delay means and to said second signal receiving means.

5. The system claimed in claim 4 and comprising phase shift means connected to said input switch means and second signal receiving means.

6. A method of amplifying two radio frequency signals having a specific temporal relationship without significantly altering said relationship, said method comprising storing a first one of said signals in a first delay line, storing a second of said signals in a second delay line, transmitting said first signal to said second delay line after said second signal has completely entered said second delay line, maintaining said second signal in said second delay line until said first signal has completely entered said second delay line, amplifying said second signal upon its emergence from said second delay line, and conveying said amplified second signal to said first delay line, amplifying said first signal after its emergence from said second delay line, and removing said second signal from said first delay line.

7. The method claimed in claim 6 and comprising receiving said first signal in first antenna means, receiving said second signal in second antenna means, conveying the amplified second signal from said first delay line to said first antenna means and conveying the amplified first signal without deliberate delay to said second antenna means.

8. An electronic counter measure system which comprises first antenna means, second antenna means, first delay means, means connecting said first antenna means to said first delay means, second delay means, means for alternately connecting said second delay means to said second antenna means and to said first delay means, signal amplification means, means connecting said second delay means to said amplification means, means for alternately connecting the output of said amplification means to said first delay means and to said second antenna means, and means for phase shifting signals received in one of said antenna means, whereby a signal received in one of said antenna means can be changed in phase, amplified is said signal amplification means and transmitted and a signal received in the other of said antenna means can be amplified in the same signal amplification means, and transmitted, without substantial change in the temporal relationship of said signals.

9. The system claimed in claim 8 wherein the second delay means has a delay capacity greater than the delay capacity of the first delay means.

10. The system claimed in claim 9 wherein said phase shifting means is connected to said second antenna means.

11. The system claimed in claim 9 wherein the second delay means has a delay capacity sufficient to accomodate simultaneously signals received from said first delay means and from said second antenna means.

* * * * *

UNITED STATES PATENT AND TRADEMARK OFFICE
CERTIFICATE OF CORRECTION

PATENT NO. : 6,633,251 B1  
DATED : October 14, 2003  
INVENTOR(S) : Huggett

It is certified that error appears in the above-identified patent and that said Letters Patent is hereby corrected as shown below:

Column 1,  
Line 19, delete "receiver they" and replace with -- receiver, they --.  
Line 39, delete "bands its" and replace with -- bands, its --.  
Line 65, delete "system" and replace with -- system, --.

Column 2,  
Line 14, delete "are" and replace with -- are a --.  
Line 37, delete "a," and replace with -- a --.  
Line 65, delete "amplification 5 chain" and replace with -- amplification chain --.

Column 3,  
Line 29, delete "electromechanical" and replace with -- electro-mechanical --.

Column 5,  
Line 17, delete "delay-line" and replace with -- delay line --.  
Line 63, delete "line the" and replace with -- line, the --.

Column 6,  
Line 1, delete "84," and replace with -- 84 --.  
Line 25, delete "a means" and replace with -- means --.

Signed and Sealed this

Twenty-third Day of December, 2003

JAMES E. ROGAN  
*Director of the United States Patent and Trademark Office*

UNITED STATES PATENT AND TRADEMARK OFFICE
CERTIFICATE OF CORRECTION

PATENT NO. : 6,633,251 B1  Page 1 of 1
DATED : October 14, 2003
INVENTOR(S) : Huggett It is certified that error appears in the above-identified patent and that said Letters Patent is hereby corrected as shown below:

<u>Column 1,</u>
Line 1, insert:

-- STATEMENT REGARDING FEDERALLY SPONSORED RESEARCH

This invention was made with Government support under Contract No. F33615-76-C-1353 awarded by the Department of the Air Force. The Government has certain rights in this invention. --

Signed and Sealed this

Twentieth Day of April, 2004

JON W. DUDAS
*Acting Director of the United States Patent and Trademark Office*